US010896277B1

(12) United States Patent
Pedneau

(10) Patent No.: US 10,896,277 B1
(45) Date of Patent: Jan. 19, 2021

(54) OVER-CONSTRAINTS FOR FORMAL VERIFICATION

(71) Applicant: Cadence Design Systems, Inc., San Jose, CA (US)

(72) Inventor: Mike Pedneau, Austin, TX (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/440,297

(22) Filed: Jun. 13, 2019

(51) Int. Cl.
   *G06F 17/50*      (2006.01)
   *G06F 30/3323*    (2020.01)
   *G06F 30/23*      (2020.01)
   *G06F 30/33*      (2020.01)
   *G06F 111/04*     (2020.01)

(52) U.S. Cl.
   CPC .......... *G06F 30/3323* (2020.01); *G06F 30/23* (2020.01); *G06F 30/33* (2020.01); *G06F 2111/04* (2020.01)

(58) Field of Classification Search
   CPC ...... G06F 30/3323; G06F 30/23; G06F 30/33; G06F 2111/04
   See application file for complete search history.

(56) References Cited

U.S. PATENT DOCUMENTS

| 7,421,668 | B1 * | 9/2008 | Ip ........................ G06F 30/3323 716/108 |
| 8,156,462 | B2 | 4/2012 | Moon |
| 8,316,332 | B1 | 11/2012 | Goyal et al. |
| 8,381,148 | B1 | 2/2013 | Loh et al. |
| 8,863,049 | B1 | 10/2014 | Lundgren et al. |
| 8,990,746 | B1 * | 3/2015 | Goyal ................. G06F 30/3323 716/106 |
| 10,289,798 | B1 * | 5/2019 | Nunes Barcelos ... G06F 30/398 |
| 10,706,195 | B1 * | 7/2020 | Rezende Barbosa ... G06F 30/31 |
| 2002/0178425 | A1 | 11/2002 | Abe |
| 2009/0144683 | A1 * | 6/2009 | Lehavot ................ G06F 30/398 716/113 |
| 2010/0218150 | A1 * | 8/2010 | Baumgartner ...... G06F 30/3323 716/103 |
| 2014/0330758 | A1 | 11/2014 | Yu |

* cited by examiner

*Primary Examiner* — Nghia M Doan
(74) *Attorney, Agent, or Firm* — Tarolli, Sundheim, Covell & Tummino LLP

(57) ABSTRACT

In the described examples, an electronic design automation formal verification EDA application is configured to receive an initial evaluation of a circuit design of an integrated circuit (IC) chip. The circuit design of the IC chip includes a list of properties for the IC chip, and the list of properties includes a list of assertions for the IC chip. The formal verification EDA program extracts a counter-example trace from the initial evaluation. The counter-example trace characterizes a set of signals over a plurality of cycles that reach a state in which a given assertion in the list of assertions does not hold true. The formal verification EDA program identifies a subset of signals in the counter-example trace that remain in a specific constant value over the plurality of cycles. The formal verification EDA program executes an over-constrained formal verification for the circuit design.

20 Claims, 8 Drawing Sheets

- Inputs <input> 46 over-constraints
- FSMs <fsm> 10 over-constraints
- Counters <counter> 41 over-constraints
- Pattern-match signal names <valid> 49 over-constraints
- Un-initialized flops <nonreset> 69 over-constraints

| | Type | Name | Engine | Bound | Time | Task | Traces |
|---|---|---|---|---|---|---|---|
| ✗ | Assert | mst_missing_fc_timeout | B | 34 | 22.5 | <all> | 1 |
| ✗ | Assert | mst_missing_fc_timeout | B | 34 | 36.1 | <counter> | 1 |
| ✗ | Assert | mst_missing_fc_timeout | B | 34 | 36.9 | <valid> | 1 |
| ✗ | Assert | mst_missing_fc_timeout | B | 34 | 69.5 | <fsm> | 1 |
| ✗ | Assert | mst_missing_fc_timeout | B | 34 | 71.0 | <input> | 1 |
| ✗ | Assert | mst_missing_fc_timeout | B | 34 | 145.4 | <nonreset> | 1 |
| ✗ | Assert | mst_missing_fc_timeout | B | 34 | 207.1 | <baseline> | 1 |

FIG. 7

OVER-CONSTRAINTS FOR FORMAL VERIFICATION

TECHNICAL FIELD

This disclosure relates to electronic design automation (EDA) applications. More particularly, this disclosure relates to a formal verification EDA application that applies over-constraints for formal verification of a circuit design of an integrated circuit (IC) chip.

BACKGROUND

Electronic design automation (EDA), also referred to as electronic computer-aided design (ECAD), is a category of software applications for designing electronic systems such as integrated circuits and printed circuit boards. The applications work together in a design flow that chip designers use to design and analyze entire semiconductor chips. Since modern semiconductor chips can have billions of components, EDA applications are essential for their design. As one example, EDA applications can include logic synthesis, logic simulation and formal verification.

Logic synthesis is a process by which an abstract specification of desired circuit behavior, typically at the register-transfer level (RTL), is turned into a design implementation in terms of logic gates, typically by a computer application called a synthesis tool (a particular EDA application). Common examples of this process include synthesis of designs specified in hardware description languages, including VHDL and Verilog. Some synthesis tools generate bitstreams for programmable logic devices such as application array logic (PAL) devices or field programmable gate arrays (FPGAs), while others target the creation of application specific integrated circuits (ASICs).

Logic simulation is the use of simulation software (another EDA application) to predict the behavior of digital circuits and hardware description languages. Simulation can be performed at varying degrees of physical abstraction, such as at the transistor level, gate level, the RTL, electronic system-level (ESL), or behavioral level.

Formal verification is the use of formal verification software (yet another EDA application) to execute the task of verifying that the logic design conforms to specification. This is a complex task, and takes the majority of time and effort in most large electronic system design projects. Most formal verifications are executed on the gate level of a circuit.

Deep bug handling (DBH) is a hybrid between formal verification and logic simulation. DBH executes a more exhaustive verification analysis than logic simulation, but less exhaustive than formal verification. The degree of exhaustion is configurable.

SUMMARY

One example relates to a non-transitory machine readable medium having machine readable instructions, the machine readable instructions including a formal verification electronic design automation (EDA) application. The formal verification EDA application is configured to receive an initial evaluation of a circuit design of an integrated circuit (IC) chip. The circuit design of the IC chip has a list of properties for the IC chip, wherein the list of properties includes a list of assertions for the IC chip. The formal verification EDA program is also configured to extract a counter-example trace from the initial evaluation, wherein the counter-example trace characterizes a set of signals over a plurality of cycles that reach a state in which a given assertion in the list of assertions does not hold true. The formal verification EDA application is further configured to identify a subset of signals in the counter-example trace that remain in a specific constant value over the plurality of cycles. The formal verification EDA program is still further configured to execute an over-constrained formal verification for the circuit design, wherein the formal verification EDA application sets over-constraints based on the identified subset of signals for the counter-example trace.

Another example relates to a method that includes receiving, by a formal verification electronic design automation (EDA) application executing on a computing platform, an initial evaluation of a circuit design of an IC chip. The circuit design of the IC chip includes a list of properties for the IC chip, wherein the list of properties includes a list of assertions for the IC chip. The method also includes extracting, by the formal verification EDA application, a counter-example trace from the initial evaluation. The counter-example trace characterizes a set of signals over a plurality of cycles that reaches a state in which a given assertion of the list of assertions does not hold true. The method further includes identifying a subset of signals in the counter-example trace that remain in a specific constant value over the plurality of cycles. The method further includes setting over-constraints for an over-constrained formal verification of the circuit design based on the subset of signals.

Yet another example relates to a system including a non-transitory memory to store machine readable instructions and a processor to access the memory and execute the machine readable instructions. The machine readable instructions include a formal verification EDA application, the formal verification EDA application being configured to receive an initial formal verification of a circuit design of an IC chip, the circuit design having a list of properties for the IC chip, wherein the list of properties includes a list of assertions for the IC chip. The initial formal verification includes a counter-example trace that characterizes a set of signals over the plurality of cycles that reach state in which a given assertion of the list of assertions of does not hold true. The formal verification EDA application is also configured to identify a subset of signals in the counter-example that remain in a specific constant value over the respective plurality of cycles. The formal verification EDA application further provides over-constraints for an over-constrained formal verification of the circuit design of the IC chip based on the identified subset of signals. The formal verification EDA application can still further execute the over-constrained formal verification for the circuit design of the IC chip that applies the over-constraints, wherein the over-constrained formal verification has a smaller state space than the initial formal verification.

BRIEF DESCRIPTION OF THE DRAWINGS

FIG. 7 illustrates tables characterizing results of a formal verification of a circuit design with over-constraints.

DETAILED DESCRIPTION

This disclosure relates to systems and methods for executing an over-constrained formal verification of a circuit design, such as a design for an integrated circuit (IC) chip. The circuit design includes a list of properties for the IC chip, wherein the list of properties defines a set of assertions for the IC chip. As used herein, the term "over-constrained formal verification" refers to a formal verification executed by an electronic design automation (EDA) application executing on a computing platform that applies over-constraints. An over-constraint refers a legal state in a state space for a circuit design that does not impact operation of a counter-example trace. The counter-example characterizes a set of signals over a plurality of cycles that reach a state of the IC chip corresponding to the circuit design in which an assertion in the list of properties does not hold true.

To execute the over-constrained formal verification, an initial evaluation of the circuit design is received at the formal verification EDA application. As one example, the initial evaluation can be a formal verification of the circuit design executed by the formal verification EDA application without over-constraints. In other examples, as discussed herein, other EDA applications are employable to execute the initial evaluation. The formal verification application extracts a counter-example trace from the initial evaluation. The formal verification application identifies a subset of signals in the trace of the set of traces that remain in a specific constant value over the plurality of cycles and sets over-constraints for a formal verification of the circuit design based on the subset of signals. The formal verification EDA application executes the over-constrained formal verification based on the over-constraints. Relative to a formal verification of the circuit design without over-constraints applied, the over-constrained formal verification has a smaller state space to evaluate, thereby reducing an overall computational burden and time of execution of the formal verification.

Figure 1:
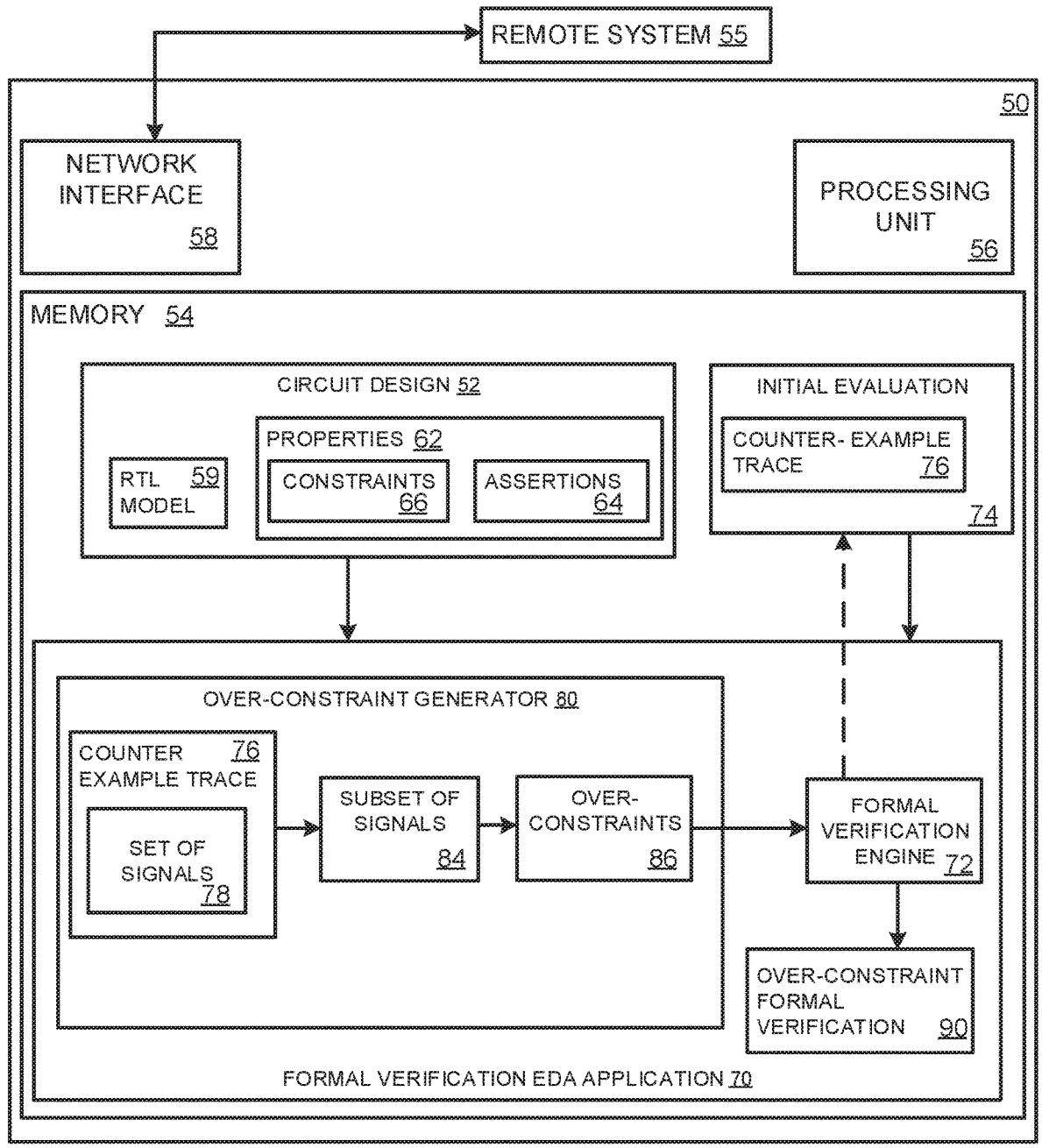
FIG. 1 illustrates an example of a system for executing a formal verification of a circuit design with over-constraints.

FIG. 1 illustrates an example of a system 50 for determining and applying over-constraints to execute a formal verification of a circuit design 52. The system 50 can represent a computing platform. Accordingly, the system 50 can include a memory 54 for storing machined readable instructions and data and a processing unit 56 for accessing the memory 54 and executing the machine readable instructions. The memory 54 represents a non-transitory machine readable memory, such as random access memory (RAM), a solid state drive, a hard disk drive or a combination thereof. The processing unit 56 can be implemented as one or more processor cores. The system 50 can include a network interface 58 (e.g., a network interface card) configured to communicate with other computing platforms via a network, such as a public network (e.g., the Internet), a private network (e.g., a local area network) or a combination thereof (e.g., a virtual private network).

The system 50 could be implemented in a computing cloud. In such a situation, features of the computing platform, such as the processing unit 56, the network interface 58, and the memory 54 could be representative of a single instance of hardware or multiple instances of hardware with applications executing across the multiple of instances (i.e., distributed) of hardware (e.g., computers, routers, memory, processors, or a combination thereof). Alternatively, the system 50 could be implemented on a single dedicated server or workstation.

The circuit design 52 can be stored in the memory 54. The circuit design 52 can be implemented, for example, as design specifications for an integrated circuit (IC) chip. The circuit design 52 can be generated with an electronic design automation (EDA) application, such as a logic synthesis application (e.g., a synthesis tool). In such a situation, an end-user of a remote system 55 can employ a user-interface to generate and/or modify hardware description language (HDL) code (e.g., Verilog) for generating a resistor-transfer level (RTL) model 59 (e.g., RTL code) characterizing a circuit, wherein the RTL model 59 is transformable by an EDA application into a physically realizable gate-level netlist for the circuit design 52.

Additionally, the circuit design 52 includes a set of properties 62 that define a list of assertions 64 and constraints 66 for the circuit design 52. Moreover, in examples where the circuit design 52 was generated with Verilog, the properties 62 may be referred to as SystemVerilog Assertions (SVAs). The assertions 64 of the properties 62 define states for the circuit design 52, which if occur on a fabricated IC chip for the circuit design 52 would indicate that the circuit design has design errors (e.g., bugs). The constraints 66 (alternatively referred to as assumptions) of the properties 62 define rules, such as input states for RTL model 59 for operating the IC chip characterized by the circuit design 52. Such constraints 66, if violated, would cause errors in a fabricated IC chip corresponding to the circuit design 52, wherein simulation and/or formal verification of such violations of the constraints 66 need not be evaluated. Stated differently, constraints 66 define illegal (unpermitted) states of the IC chip corresponding to the circuit design 52, and assertions 64 define states that should hold true during operation of the IC chip corresponding to the circuit design 52.

In some examples, the circuit design 52 is updated through an iterative process. For instance, the circuit design 52 could be provided to a logic simulation EDA application that simulates operating a circuit corresponding to the circuit design 52 and the results of the simulation are employable to update the circuit design 52.

As one example, the system 50 receives the circuit design 52 that includes the RTL model 59 and the properties 62 via the network interface 58. The system 50 stores the circuit design 52 in the memory 54. The memory 54 also includes an initial evaluation 74 of the circuit design 52.

Before fabrication of an IC chip corresponding to the circuit design 52, the circuit design 52 is subjected to formal verification. Formal verification refers to the process of establishing functional correctness between the RTL model 59 and the assertions 64 without running simulations.

More specifically, formal verification is an exhaustive mathematical analysis to prove or disprove the correctness of a circuit design with respect to a set of assertions specifying intended design behavior. In chip hardware design, formal verification is a systematic process to verify that the design intent (assertion specification) is preserved in the implementation (the RTL model 59). Given the huge number of states in even a small design, it is impractical to simulate more than a miniscule percentage of design behavior. Moreover, the simulation is probabilistic and the chances of exercising every scenario that would reveal a design bug are relatively small. Corner-case bugs, namely bugs that require very specific conditions to be triggered, are often missed in simulation. Formal verification statically analyzes the circuit design 52 for all possible input sequences (or some subset thereof) and all possible state values (or some subset thereof), checking to see if assertions included in the properties 62 can be violated. These violations are referred to as "counter-examples" since each represents a way in which the implementation does not match the specification of intended behavior. If no such counter-examples are found, formal verification can often prove that there is no possible way to violate any of the properties 62 of the circuit design 52. An ideal formal verification is 100% exhaustive, proving each of the properties 62 of the circuit design 52 to be "safe" once all bugs have been found and fixed. However, in some situations, a 100% exhaustive verification may be impractical. Thus, the formal verification may be 90-99% exhaustive in some examples.

The memory 54 includes a formal verification EDA application 70 that can be employed to execute a formal verification of the circuit design 52. More particularly, the formal verification EDA application 70 includes a formal verification engine 72 that can generate and output an initial evaluation 74 of the circuit design 52. Data characterizing the initial evaluation 74 can be output to an end-user via a display, such as a remote display operating on the remote system 55.

In some examples, the initial evaluation 74 is generated by the formal verification engine 72 through execution of a formal verification of the circuit design 52. However, in other examples, other EDA applications are employable to generate the initial evaluation 74 and provide the initial evaluation to the formal verification EDA application 70. For example, a logic simulation EDA application or a deep-bug hunting (DBH) EDA application are also employable to generate the initial evaluation 74. In either such situation, the simulation EDA application of the DBH EDA application may not be an exhaustive mathematical evaluation, but still acceptable for a first evaluation of the circuit design 52.

The initial evaluation 74 includes a counter-example trace 76 (or multiple counter-example traces). The counter-example trace 76 provides data that represents a set of signals over a plurality of cycles that cause a particular assertion 64 included in the properties 62 of the circuit design 52. Thus, the counter-example trace 76 identifies a bug in the circuit design 52. In some examples, the initial evaluation 74 is provided to the remote system 55 and results of the initial evaluation 74 are displayed. In response, the end-user may modify the circuit design 52 with the logic synthesis EDA application in an effort fix the bug present in the circuit design 52. In this situation, the updated circuit design 52 is provided to the system 50 to overwrite the previous version of the circuit design 52.

The formal verification EDA application 70 includes an over-constraint generator 80 that can generate over-constraints for the formal verification engine 72. As noted, the properties 62 of the circuit design 52 define constraints that correspond to rules for implementing an IC chip based on the circuit design 52. However, as used herein, the term "over-constraint" refers to an additional constraint for the formal verification engine 72 that is outside the circuit design 52. Inclusion of over-constraints reduces a size of a state space that is evaluated to complete a formal verification of the circuit design 52.

The over-constraint generator 80 extracts the counter-example trace 76 from the initial evaluation 74. As noted, the counter-example trace 76 defines a set of signals 78 with states of each signal in the set of signals 78 over a plurality of cycles that cause a assertion identified in a particular property 62 of the circuit design 52. The over-constraint generator 80 parses the set of signals 78 of the counter-trace example 76 to identify a subset of the set of signals 78, namely a subset of signals 84 that remain a specific constant value over the plurality of cycles in the counter-example trace 76.

Figure 2:
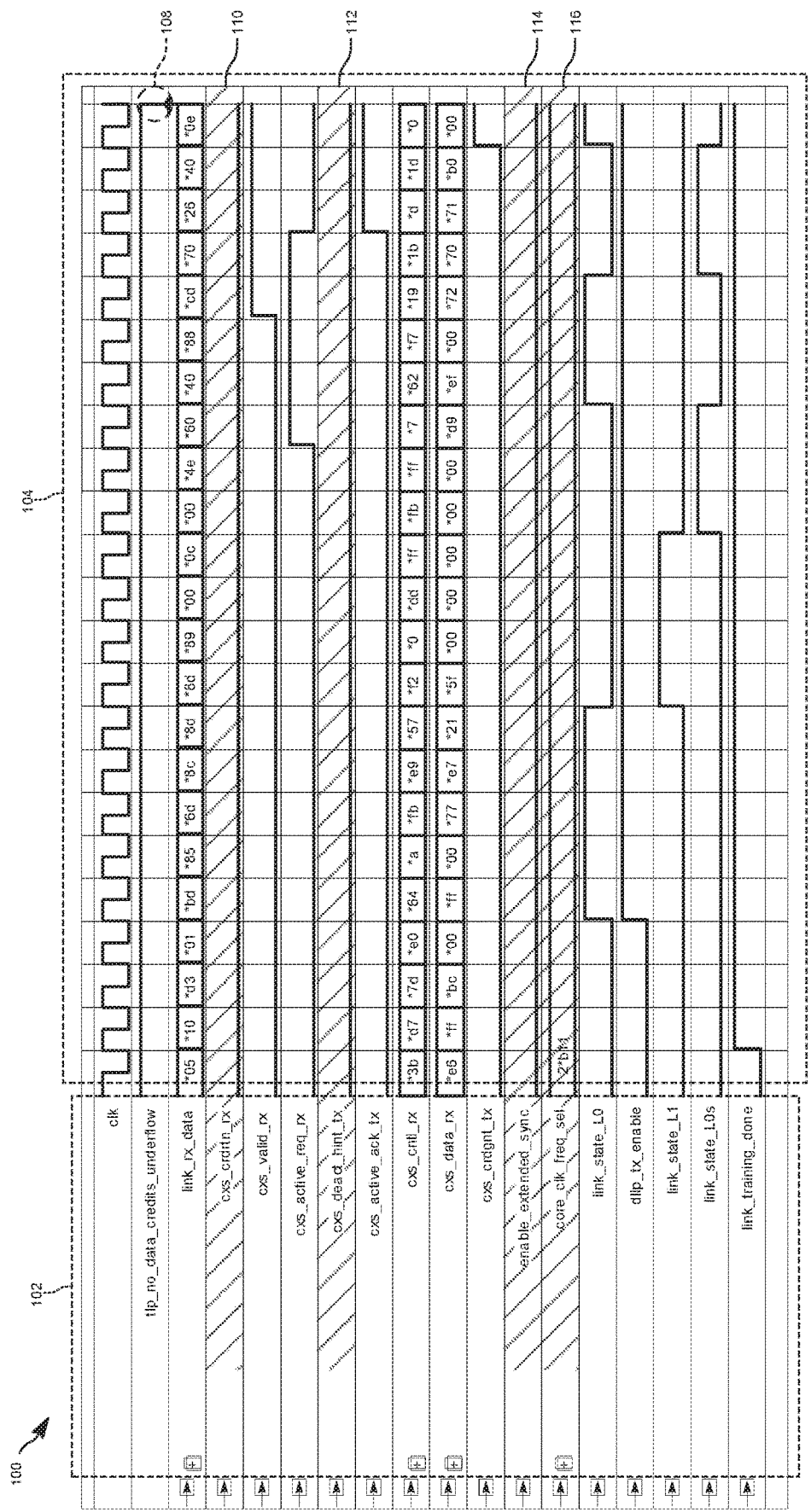
FIG. 2 illustrates a diagram of a counter-example trace.

FIG. 2 illustrates an example of a counter-example trace 100 that could be employed to implement the counter-example trace 76 of FIG. 1. The counter-example trace 100 includes a set of signals 102 employed in a circuit design (e.g., the circuit design 52 of FIG. 1). The set of signals 102 includes a name of each signal. Each signal in set of signals 102 could represent, for example, input signals, a state of a finite state machine (FSM), a state of a counter, a state of a data structure (e.g., an array) identified through pattern matching, a state of a flop, etc. The counter-example trace 100 also includes a state descriptor 104 for each signal in the set of signals. The state descriptor 104 provides data characterizing a state of each of the set of signals 102 over a plurality of cycles. Moreover, the state descriptor 104 also demonstrates achievement of a state in which an assertion 108 does not hold true. The assertion 108 is a state defined in properties of the circuit design, such as the properties 62 of FIG. 1. Accordingly, the counter-example trace 100 identifies a specific set of states (identified in the state descriptor 104) over the plurality of cycles for a specific set of signals (the set of signals 102) that that reach a state in which the assertion (or multiple assertions, in some examples) does not hold true, demonstrating a bug (or multiple bugs) in the circuit design.

Continuing with the present example, the over-constraint generator 80 of FIG. 1 parses the counter-example trace 100 to identify a subset of signals that remain in a specific constant value over the plurality of cycles in the state descriptor 104. As illustrated, four (4) signals, namely (i) cxs_crdrts_rx 110 (ii) cxs_deact_hint_tx 112 (iii) enable_extended_sync 114 and (iv) core_clk_freq_sel 116 remain in a specific constant value over the plurality of cycles in the state descriptor 104. Remaining in a specific constant value over the plurality of cycles in the state descriptor 104 indicates that the subset of signals defined as signals 110, 112, 114 and 116 do not need to change states (e.g., oscillate) in order for the assertion 108 to not hold true. Stated differently, the assertion 108 does not hold true even in situations where the signals 110, 112, 114 and 116 remain in a specific constant value over the entirety of the plurality of cycles.

Referring back to FIG. 1, the over-constraint generator 80 parses the counter-example trace 76 to identify the subset of signals 78 that remain in a specific constant value over a plurality of cycles in the counter-example trace. In particular, the over-constraint generator 80 examines each signal in the set of signals 78 and categorizes each such signal as remaining in a specific constant value or not remaining in a specific constant value over the plurality of cycles.

The over-constraint generator 80 employs the subset of signals 84 that remain in a specific constant value over the plurality of cycles to generate a set of over-constraints 86.

Each of the set of over-constraints 86 defines a signal that can be held in a specific constant value by the formal verification engine 72 during a formal verification of the circuit design 52 to reduce a total state space needed for formal verification of the circuit design 52. The over-constraints 86 are provided to the formal verification engine 72 for execution of an over-constrained formal verification 90.

In examples where the initial evaluation 74 is generated by the formal verification engine 72, the over-constrained formal verification 90 may be a second or later formal verification of the circuit design 52, which may have changed since the initial evaluation 74 was generated. In examples where the initial evaluation 74 was generated by a different EDA application, such as a logic simulation EDA application or a DBG EDA application, the over-constrained formal verification 90 may be the first formal verification of the circuit design 52.

As noted, the over-constraints 86 reduce the state space evaluated to complete the over-constrained formal verification 90 for the circuit design 52. More particularly, by applying the over-constraints 86, fewer variables are dithered during the formal verification of the circuit design 52 than a formal verification without the over-constraints. Accordingly, application of the over-constraints significantly reduces the computational burden and time for execution needed to complete the over-constrained formal verification 90. In some examples, the over-constrained formal verification 90 may reduce the computational time of a formal verification that omits the over-constraints by 50%-95%.

Figure 3:
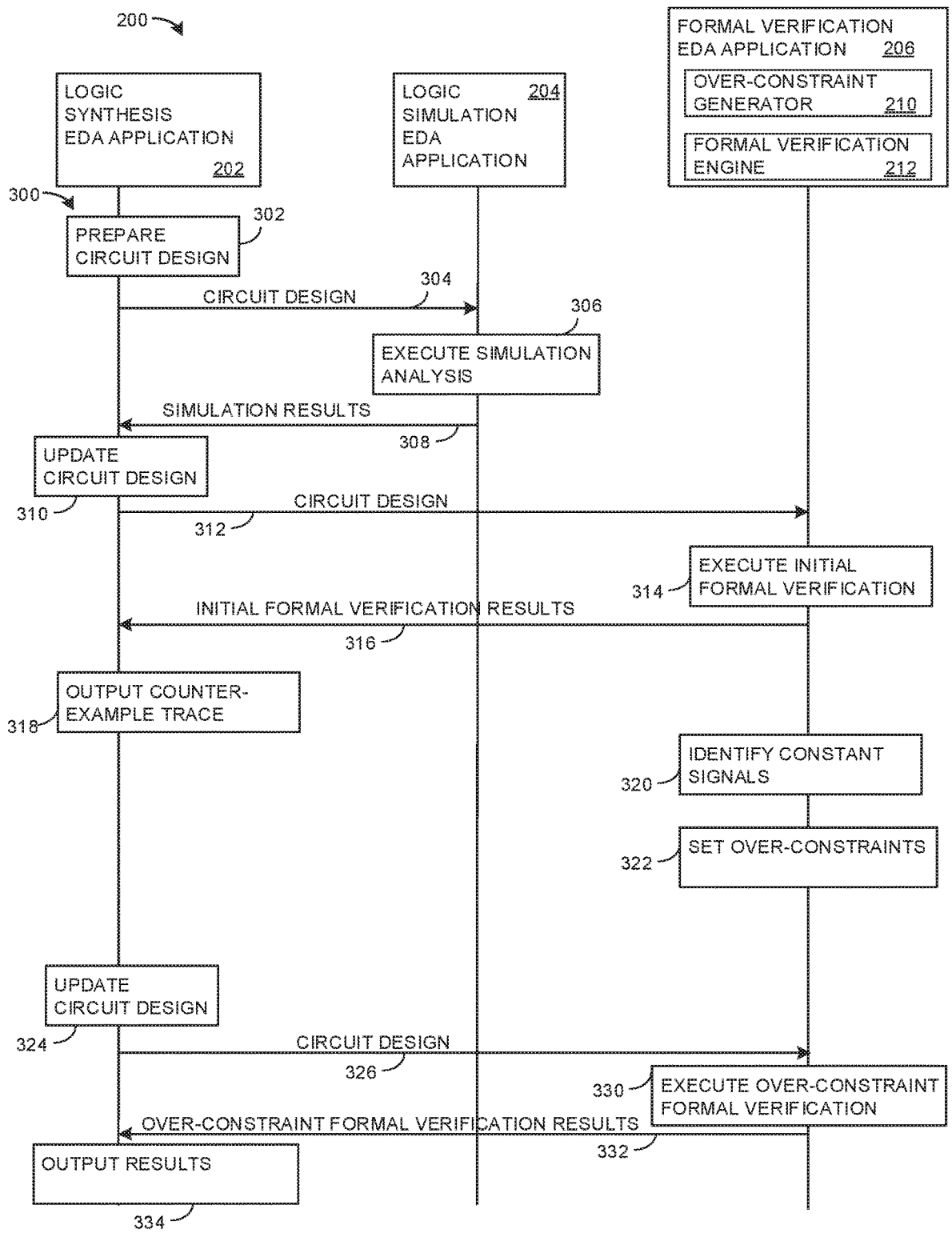
FIG. 3 illustrates a timing diagram of a system for executing a formal verification of a circuit design with over-constraints.

FIG. 3 illustrates a timing diagram depicting an example of a timing of operations by a system 200 for implementing a method 300 for executing a formal verification of a circuit design. The timing of the operations could occur in other orders from that shown. The system 200 can include a logic synthesis EDA application 202, a logic simulation EDA application 204 and a formal verification EDA application 206. The logic synthesis EDA application 202, the logic simulation EDA application 204 and the formal verification EDA application 206 can operate on separate computing platforms or on the same computing platform. Moreover, the formal verification EDA application 206 can be implemented with the formal verification EDA application 70 operating on the system 50 of FIG. 1. The formal verification EDA application 206 includes an over-constraint generator 210 that could be implemented with the over-constraint generator 80 of FIG. 1. Further, the formal verification EDA application 206 includes a formal verification engine 212 that could be implemented with the formal verification engine 72 of FIG. 1.

Additionally, for purposes of simplification of explanation, it is presumed that the logic synthesis EDA application 202 is executing on or in communication with an end-user device such as the remote system 55 of FIG. 1. Accordingly, it is presumed that the logic synthesis EDA application 202 includes a user interface.

At 302 the logic synthesis EDA application 202 is employed to prepare a circuit design (e.g., the circuit design 52 of FIG. 1). The circuit design includes an RTL model and properties. The properties include a list of constraints and a list of assertions for the circuit design.

At 304, the circuit design is provided to the logic simulation EDA application 204. At 306, the logic simulation EDA application 204 executes a simulation analysis on the circuit design. At 308, results of the simulation analysis are provided to the logic synthesis EDA application 202. At 310, the circuit design is updated by the logic synthesis EDA application 202 to address problems identified in the simulation results.

At 312, the formal verification EDA application 206 receives the circuit design from the logic synthesis EDA application 202. At 314, the formal verification EDA application 206 executes an initial formal verification of the circuit design. The initial formal verification of the circuit design can implement the initial evaluation 74 of FIG. 1. The initial formal-verification is executed without over-constraints. The initial formal verification includes a counter-example trace. The counter-example trace includes data characterizing states of a set of signals in the circuit design over a plurality of cycles that reach a state in which an assertion in the circuit design does not hold true.

Figure 4:
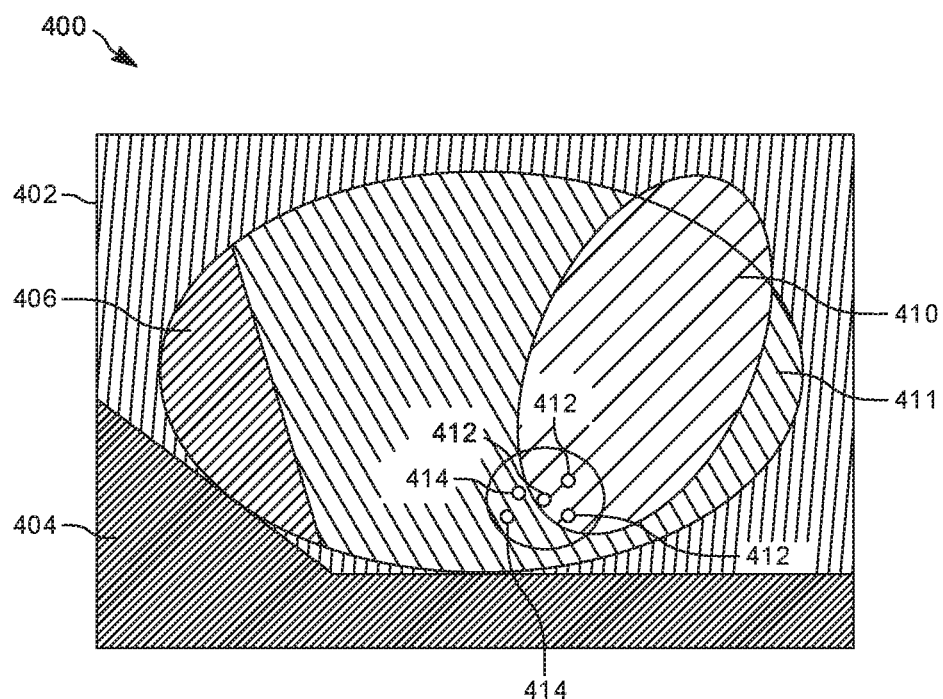
FIG. 4 illustrates a diagram of an example of a state space for a formal verification of a circuit design.

FIG. 4 illustrates a diagram that depicts an example of a state space 400 for an initial formal verification of a circuit design without over-constraints. The state space 400 represents the full set of states possible for the circuit design. The state space 400 includes an illegal state region 402 that is not supported by the circuit design (e.g., based on the constraints listed in the properties of the circuit design). Thus, the illegal state region 402 may be evaluated (or partially evaluated) during a formal verification of the circuit design due to a lack of constraints (e.g., assumptions) preventing evaluation of the illegal state region 402. The state space 400 also includes a constraint region 404 that is not evaluated based on constraints (e.g., the constraints 66 of FIG. 1) in the properties of the circuit design. The state space 400 also includes an unreachable state region 406 that defines states that are not possible for the circuit design to achieve. Similar to the constraint region 404, the unreachable state region 406 is not evaluated during a formal verification of the circuit design.

The state space 400 includes a formal verification region 410 that defines a region of the state space 400 that is exhaustively evaluated during the initial formal verification. The state space 400 still further includes an unevaluated state region 411 that defines a region of the state space 400 that has not been evaluated.

The initial formal verification reveals three (3) counter-examples traces 412, each represented as a dot in the formal verification region 410. However, in the illustrated example, two (2) additional counter-example traces 414 are present the unevaluated state region 411 that are not revealed during the initial formal verification.

Referring back to FIG. 3, at 316 results of the initial formal verification are provided to the logic synthesis EDA application 202. At 318, the counter-example in the results of the initial formal verification are output (e.g., to an end-user) by the logic synthesis EDA application 202. In the example illustrated, the results of the initial formal verification are output at the logic synthesis EDA application 202. However, in other examples, the results of the initial formal verification can be output at the end-user device in communication with the logic synthesis EDA application 202 or on an end-user device in communication with the formal verification EDA application 206.

At 320, the over-constraint generator 210 of the formal verification EDA application 206 extracts the counter-example and identifies signals in the counter-example of the formal verification of the circuit design that remain in a specific constant value. More particularly, the over-constraint generator 210 parses the counter-example trace to identify a subset of signals that remain in a specific constant value over the plurality of cycles. As one example, the over-constraint generator 210 can employ operations similar to the operations executed by the over-constraint generator 80 of FIG. 1. At 322, the over-constraint generator 210 sets over-constraints for further formal verification of the circuit design based on the subset of signals that remain in a specific constant value over the plurality of cycles.

At 324, the logic synthesis EDA application 202 updates the circuit design based on the counter-example trace in an attempt to correct a bug identified by the counter-example trace. At 326, the logic synthesis EDA application 202 provides the updated circuit design to the formal verification EDA application 206. At 330, the formal verification engine 212 of the formal verification EDA application 206 employs the over-constraints provided by the over-constraint generator 210 to execute an over-constrained formal verification of the circuit design. The over-constrained formal verification evaluates a smaller state space the initial formal verification executed at 314.

Figure 5:
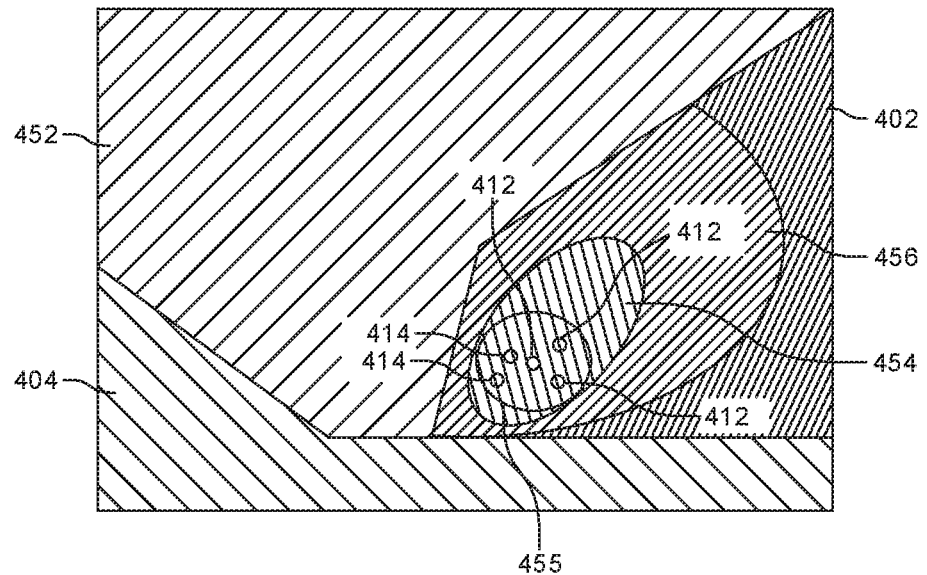
FIG. 5 illustrates a diagram of an example of a state space for a formal verification of a circuit design with over-constraints.

FIG. 5 illustrates a diagram depicting an example of a state space 450 evaluated during an over-constrained formal verification of a circuit design. For purposes of simplification of explanation, FIGS. 5 and 6 employ the same reference numbers to denote the same structures.

The state space 450 represents the full set of states possible for the circuit design. The state space 450 has the same total state space as the state space 400 of FIG. 4, but fewer states are evaluated in the state space 450 to execute the over-constrained formal verification. The state space 450 includes the illegal state region 402, as well as the constraint region 404 that is defined by the circuit design (e.g., the properties of the circuit design). Further, the state space 450 includes an over-constrained state space 452 that defines states which are legal (permitted by the circuit design) but are not necessary to evaluate for a formal verification of the circuit design.

The state space 450 includes a formal verification region 454 that defines a region of the state space 450 that is exhaustively evaluated during the over-constrained formal verification. The formal verification region 454 of FIG. 5 encompasses a counter-example region 455 of the state space 450 based on the three (3) counter-example traces 412 revealed in the initial formal verification explained with respect to FIG. 4. The counter-example region 455 also includes the two (2) counter-examples that were not revealed during the initial formal verification explained with respect to FIG. 4. The state space 450 still further includes an unevaluated state region 456 that defines a region of the state space 450 that has not been evaluated.

As a comparison to the diagram of the state space 400 of FIG. 4 and the state space 450 of FIG. 5, the formal verification region 454 of FIG. 5 is less than one-half the size of the formal verification region 410 of FIG. 4. Additionally, the unevaluated state region 456 is about one-half the size of the unevaluated state region 411 of FIG. 4. Thus, the computational burden for executing (and corresponding execution time) the exhaustive evaluation executed for the over-constrained formal verification is also less than half than the computational burden for (and corresponding execution time) executing the initial formal verification. Further, as noted, in the example illustrated, the over-constrained formal verification exhaustively evaluates the counter-example region 455 of the state space 450 of FIG. 5 revealing each of the five (5) counter-examples 412 and 414. In contrast, the formal verification region 410 of the state space 400 of FIG. 4 covers only three (3) counter-examples 412. Thus, in addition to reducing the computational burden of the formal verification evaluation, the over-constrained formal verification exhaustively evaluates more state space more relevant to the initial formal verification. Stated differently, the over-constrained formal verification exhaustively evaluates a region of the state space that is not evaluated in the formal verification that omits the over-constraints.

Referring back to FIG. 3, at 332, results of the over-constrained formal verification are provided to the logic synthesis EDA application 202. At 334, the logic synthesis EDA application outputs results to the end-user. In situations where the over-constrained formal verification still include a counter-example trace, indicating that a bug is still present in the circuit design, the logic synthesis EDA application 202 can be employed to update the circuit design again, and the process can return to 324.

Figure 6:
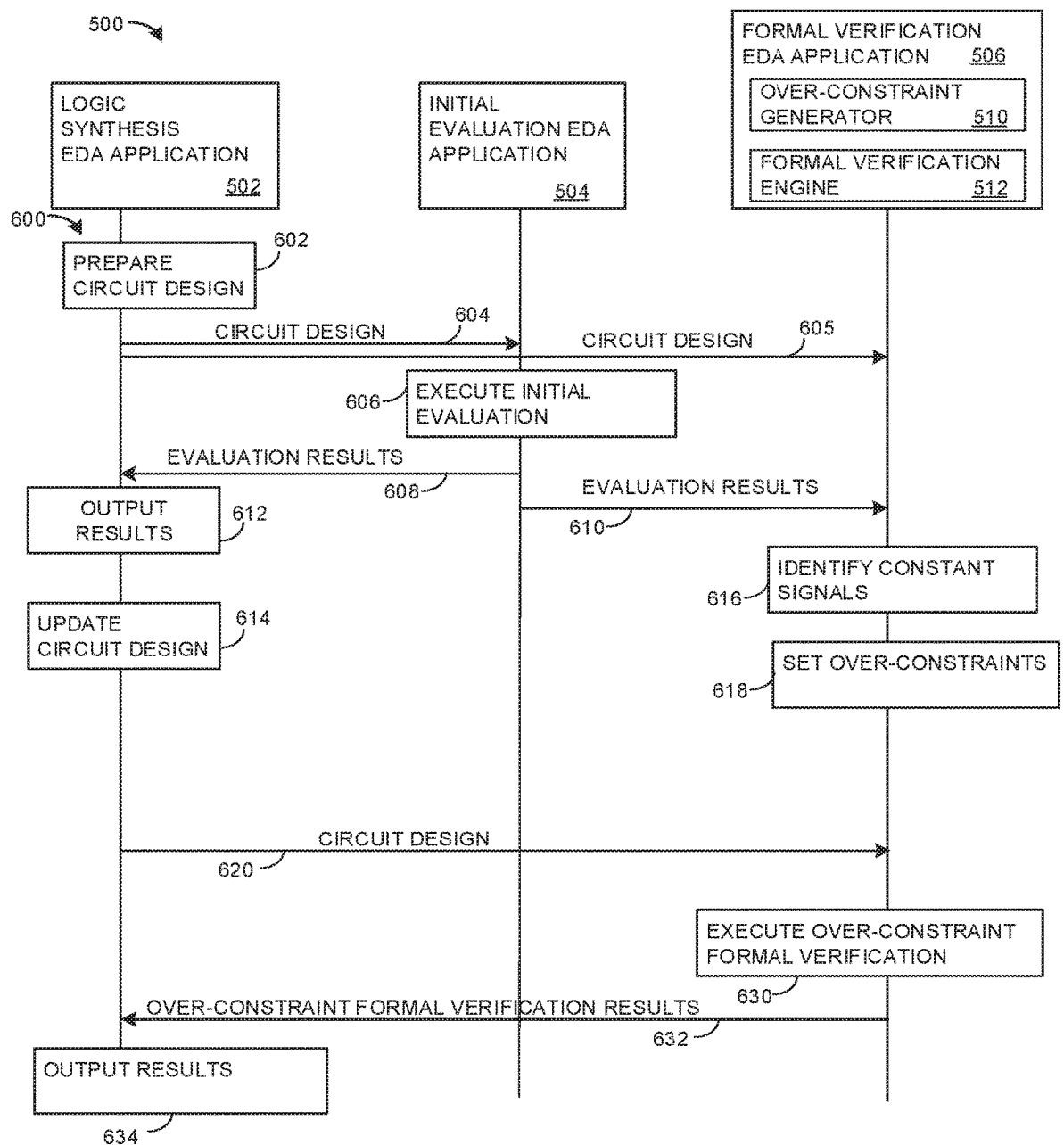
FIG. 6 illustrates another timing diagram of a system for executing a formal verification of a circuit design with over-constraints.

By employing the method 300, as illustrated in FIGS. 5 and 6, the computational burden for completing a formal verification of the circuit design is reduced, thus reducing an overall execution time. In particular, by executing a formal verification that employs the over-constraints (referred to as the over-constrained formal verification at 330) subsequent formal verifications of the circuit design have a substantially reduced computational burden than the initial (first) formal verification.

FIG. 6 illustrates an example of a timing diagram depicting another example of a timing of operations by a system 500 for implementing a method 600 for executing a formal verification of a circuit design. In other examples, operations of the method 600 can be executed in different orders. The system 500 can include a logic synthesis EDA application 502, an initial evaluation EDA application 504 and a formal verification EDA application 506. The logic synthesis EDA application 502, the initial evaluation EDA application 504 and the formal verification EDA application 506 can operate on separate computing platforms or the same computing platform. Moreover, the formal verification EDA application 506 can be implemented with the formal verification EDA application 70 operating on the system 50 of FIG. 1. The formal verification EDA application 506 includes an over-constraint generator 510 that could be implemented with the over-constraint generator 80 of FIG. 1. Further, the formal verification EDA application 506 includes a formal verification engine 512 that could be implemented with the formal verification engine 72 of FIG. 1.

The initial evaluation EDA application 504 can be implemented, for example, as a simulation EDA application or a DBH EDA application. Additionally, for purposes of simplification of explanation, it is presumed that the logic synthesis EDA application 502 is executing on or in communication with an end-user device such as the remote system 55 of FIG. 1. Accordingly, it is presumed that the logic synthesis EDA application 502 includes a user interface.

At 602 the logic synthesis EDA application 502 is employed to prepare a circuit design (e.g., the circuit design 52 of FIG. 1). The circuit design includes an RTL model and properties. The properties includes a list of constraints and a list of assertions for the circuit design.

At 604, the circuit design is provided to the initial evaluation EDA application 504 from the logic synthesis EDA application 502. At 605, the circuit design is provided to the formal verification EDA application 506 from the logic synthesis EDA application 502. At 606, the initial evaluation EDA application 504 executes an initial evaluation on the circuit design. The results of the initial evaluation can correspond to the initial evaluation 74 of FIG. 1. At 608, results of the initial evaluation are provided to the logic synthesis EDA application 502 and at 610 the results of the initial evaluation are provided to the formal verification EDA application 506. The results of the initial evaluation include a counter-example trace (or multiple counter-example traces) that define a set of signals over a plurality of cycles that reach a state in which an assertion of the circuit design does not hold true (e.g., a bug).

At 612, the logic synthesis EDA application 502 outputs the results of the initial evaluation of the circuit design. At 614, the circuit design is updated by the logic synthesis EDA application 502 to attempt address problems identified in the initial evaluation results.

At 616 the over-constraint generator 510 of the formal verification EDA application 506 extracts and parses the counter-example in the initial evaluation results to identify a subset of the set of signals that remain in a specific constant value over the plurality of cycles in the counter-example. As one example, the over-constraint generator can employ operations similar to the over-constraint generator 80 of FIG. 1 to identify the subset of signals that remain in a specific constant value over the plurality of cycles. At 618, the formal verification engine 512 can set over-constraints for an over-constrained formal verification of the circuit design based on the subset of signals in the counter-example trace that remain in a specific constant value over the plurality of cycles.

At 620, the updated circuit design is provided to the formal verification EDA application 506 from the logic synthesis EDA application 502. At 630, the formal verification engine 512 of the formal verification EDA application 506 employs the over-constraints provided by the over-constraint generator 510 to execute an over-constrained formal verification of the circuit design. The over-constrained formal verification evaluates a relatively small state space, such as the state space 450 of FIG. 5. At 632, results of the over-constrained formal verification of the circuit design are provided to the logic synthesis EDA application 502. At 634, the logic synthesis EDA application 502 outputs the results of the over-constrained formal verification. In situations where the over-constrained formal verification still includes a counter-example trace, indicating that a bug is still present in the circuit design, the logic synthesis EDA application 502 can be employed to update the circuit design again, and the process can return to 614.

By employing the method 600, the need for a computationally expensive formal verification without over-constraints of the circuit design is avoided. Instead, the initial evaluation is executed at 606 by the initial evaluation EDA application 504, which is implemented as a logic simulation EDA application or a DBH EDA application. Additionally, the first formal verification of the circuit design that is executed is the over-constrained formal verification executed at 630.

FIG. 7 illustrates data depicting example results of applying over-constraints to a formal verification of a circuit design. In the example illustrated, it is presumed that an over-constraint generator (e.g., the over-constraint generator 80 of FIG. 1) has parsed a set of signals of a counter-example trace (e.g., the counter-example trace 76 of FIG. 1) to identify a subset of the set of signals that remain in a specific constant value over a plurality of cycles, characterized in the table 700. Additionally, it is presumed that this subset of signals that remain in a specific constant value over the plurality of cycles were employed as over-constraints for a formal verification.

The table 700 includes a list of signal types. In particular, the table 700 includes 46 inputs, 10 finite state machines, 41 counters, 49 pattern-match data structure names (e.g., identified arrays) and 69 un-initialized flops for the counter-example. Thus, each of the list of signal types are employable to generate the over-constraints for the formal verification.

FIG. 7 also includes a table 720 with a column labeled "Time" that identifies a computational time (in hours) needed to execute a formal verification to a particular bound (depth of exhaustion). Row 722 of the table 720 indicates that a formal verification without constraints (labeled with the task "<baseline>", 207.1 hours are needed to complete the formal verification to the bound 34. Rows 722, 726, 728, 730, 732 and 734 of the table 720 each represent a formal verification of the circuit design wherein one (1) type of the over-constraint identified by the table 700 is employed. As is illustrated in the column labeled "Time", applying the over-constraints for even a single type of signal reduces the time needed to execute a formal verification. Additionally, row 740 represents a formal verification of the circuit design wherein each type of the over-constraint identified by the table 700 are employed. As illustrated by the column labeled "Time" for the row 740 only 22.5 hours of computational time are needed. Thus, by applying the over-constraints, the computational time is reduced from 207.1 hours to 22.5 hours, which is a reduction of over 89% for the same bound (34).

Figure 8:
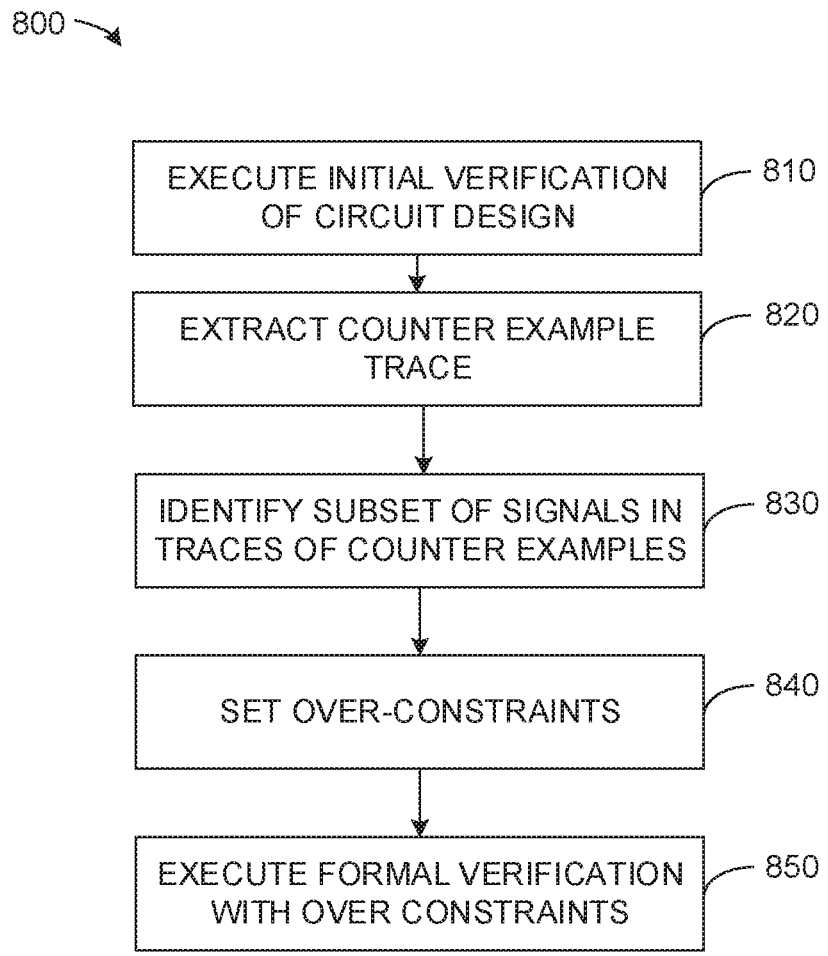
FIG. 8 illustrates a flow chart of an example method of executing a formal verification of a circuit design with over-constraints.

In view of the foregoing structural and functional features described above, example methods will be better appreciated with reference to FIG. 8. While, for purposes of simplicity of explanation, the example method of FIG. 8 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 8 illustrates a flowchart of an example method for executing a formal verification of a circuit design with over-constraints, which can be referred to as an over constraint formal verification of the circuit design of an IC chip. The method 800 can be implemented by a computing platform, such as the system 50 of FIG. 1, the system 200 of FIG. 3 and/or the system 500 of FIG. 6. At 810, an initial evaluation of the circuit design is executed. In some examples, the initial evaluation is executed by a formal verification EDA application (e.g., the formal verification EDA application 70 of FIG. 1). In other examples, the initial evaluation could be generated by a simulation EDA application or a DBH EDA application (e.g., implemented by the initial evaluation EDA application 504 of FIG. 6).

At 820, the formal verification EDA application extracts a counter-example trace from the initial evaluation of the circuit design. The counter-example trace includes a set of signals over a plurality of cycles that reaches a state in which an assertion in the circuit design does not hold true. At 830, the formal verification EDA application identifies a subset of signals in the set of signals that remain in a specific constant value over the plurality of cycles in the counter-example. At 840, the formal verification EDA application sets over-constraints for the formal verification based on the subset of signals that remain in a specific constant value over the plurality of cycles. At 850, the formal verification EDA application executes a formal verification of the circuit design with the over-constraints (e.g., an over-constrained formal verification) to reduce a state space needed to complete the formal verification.

Figure 9:
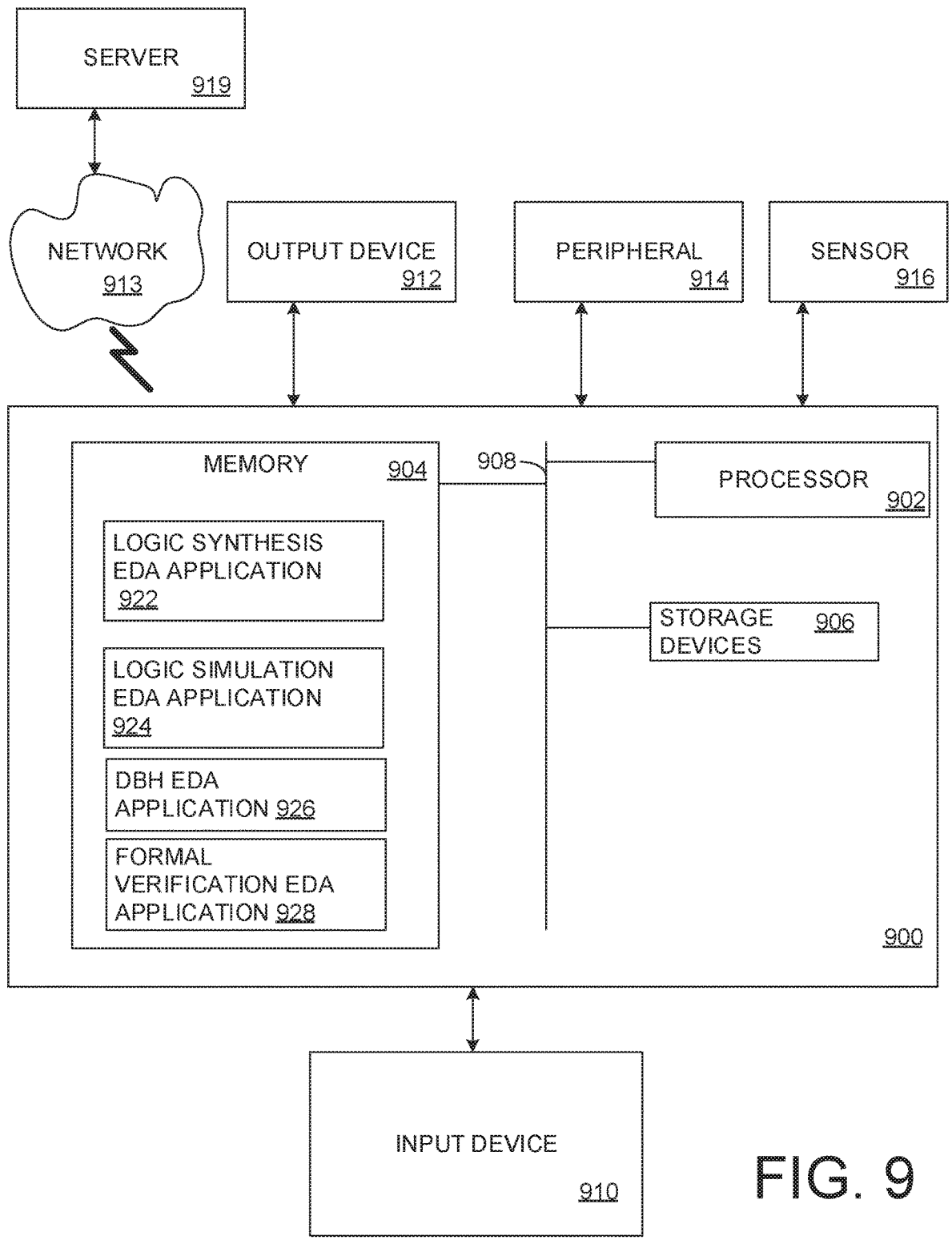
FIG. 9 illustrates an example of a computing system employable to execute a plurality of electronic design automation (EDA) applications including a formal verification EDA application.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. As shown in FIG. 9, the computing system 900 can include a computer processor 902, associated memory 904 (e.g., random access memory (RAM), cache memory, flash memory, etc.), one or more storage devices 906 (e.g., a solid state drive, a hard disk drive, an optical drive such as a compact disk (CD) drive or digital versatile disk (DVD) drive, a flash memory stick, etc.) and numerous other elements and functionalities. The computer processor 902 may be an integrated circuit for processing instructions. For example, the computer processor may be one or more cores, or micro-cores of a processor. Components of the computing system 900 can communicate over a data bus 908.

The computing system 900 may also include an input device 910, such as any combination of one or more of a touchscreen, keyboard, mouse, microphone, touchpad, electronic pen, or any other input device. Further, the computing system 900 can include an output device 912, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 912 can be the same physical device as the input device 910. In other examples, the output device 912 and the input device 910 can be implemented as separate physical devices. The computing system 900 can be connected to a network 913 (e.g., a local area network (LAN), a wide area network (WAN) such as the Internet, a mobile network, or any other type of network) via a network interface connection (not shown). The input device 910 and output device(s) 912 can be connected locally and/or remotely (e.g., via the network 913) to the computer processor 902, the memory 904 and/or the storage device 906. Many different types of computing systems exist, and the aforementioned input device 910 and the output device 912 can take other forms. The computing system 900 can further include a peripheral 914 and a sensor 916 for interacting with the environment of the computing system 900 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 900 can communicate with a server 919 via the network 913.

The memory 904 can include a plurality of EDA applications that can be employed to generate a circuit design and/or execute a simulation of the circuit design, a DBH verification or a formal verification. More particularly, the memory 904 can include a logic synthesis EDA application 922, a logic simulation EDA application 924, a DBH EDA application 926 and a formal verification EDA application 928 or any combination of these EDA applications. The formal verification EDA application 928 can execute a formal verification with over-constraints applied, which can be referred to as an over-constrained formal verification in a manner discussed herein.

Further, one or more elements of the aforementioned computing system 900 can be located at a remote location and connected to the other elements over a network 913. Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine readable instructions, the machine readable instructions comprising a formal verification electronic design automation (EDA) application, the formal verification EDA application being configured to:
    receive an initial evaluation of a given circuit design of an integrated circuit (IC) chip, the circuit design of the IC chip comprising a list of properties for the IC chip, wherein the list of properties comprises a list of assertions for the IC chip;
    extract a counter-example trace from the initial evaluation, wherein the counter-example trace characterizes a set of signals of the given circuit design of the IC chip over a plurality of cycles that reach a state in which a given assertion in the list of assertions does not hold true;
    identify a subset of signals in the counter-example trace that remain in a specific constant value over the plurality of cycles;
    generate a set of over-constraints based on the subset of signals that remain in a specific constant value;
    receive a modified circuit design based on the counter example trace, wherein the modified circuit corresponds to the given circuit design modified based on the counter-example from the initial evaluation; and
    execute a formal verification for the modified circuit design, wherein the formal verification is an over-constrained formal verification performed by the formal verification EDA application that includes each over-constraint of the set of over-constraints.

2. The medium of claim 1, wherein the initial evaluation is executed by the formal verification EDA application.

3. The medium of claim 2, wherein the over-constrained formal verification has a shorter computational time than the initial evaluation.

4. The medium of claim 2, wherein the over-constrained formal verification includes an exhaustive evaluation of a region of state space not evaluated in the initial formal verification.

5. The medium of claim 1, wherein the initial evaluation is executed by a logic simulation EDA application.

6. The medium of claim 1, wherein the initial evaluation is executed by a deep bug hunting (DBH) EDA application.

7. The medium of claim 1, wherein a given signal of the identified subset of signals of the counter-example trace corresponds to a finite state machine in the given circuit design.

8. The medium of claim 1, wherein a given signal of the identified subset of signals for the counter-example trace corresponds to an input in the given circuit design.

9. The medium of claim 1, wherein a given signal of the identified subset of signals for the counter-example trace corresponds to a counter in the given circuit design.

10. The medium of claim 1, wherein a given signal of the identified subset of signals for the counter-example trace corresponds to an array in the given circuit design.

11. The medium of claim 1, wherein a given signal of the identified subset of signals of the counter-example trace corresponds to each uninitialized flop in the given circuit design.

12. A method comprising:
receiving, by a formal verification electronic design automation (EDA) application executing on a computing platform, an initial evaluation of a given circuit design of an integrated circuit (IC) chip, the given circuit design of the IC chip comprising a list of properties for the IC chip, wherein the list of properties includes a list of assertions for the IC chip;
extracting, by the formal verification EDA application, a counter-example trace from the initial evaluation, wherein the counter-example trace characterizes a set of signals of the given circuit design of the IC chip over a plurality of cycles that reaches a state in which a given assertion of the list of assertions does not hold true;
identifying a subset of signals in the counter-example trace that remain in a specific constant value over the plurality of cycles;
generating a set of over-constraints based on the subset of signals that remain in a specific constant value;
receiving a modified circuit design based on the counter example trace, wherein the modified circuit corresponds to the given circuit design modified based on the counter-example from the initial evaluation; and
setting over-constraints for an over-constrained formal verification of the modified circuit design that includes each over-constraint of the set of over-constraints.

13. The method of claim 12, further comprising executing the over-constrained formal verification for the modified circuit design, wherein the formal verification applies the over-constraints to reduce a state space for the over-constrained formal verification.

14. The method of claim 12, wherein the initial evaluation is executed by the formal verification EDA application.

15. The method of claim 14, wherein a computational time for the over-constrained formal verification is less than one-half of a computational time for the initial evaluation.

16. The method of claim 14, wherein the over-constrained formal verification includes an exhaustive evaluation of a region of a state space not evaluated in the initial formal verification.

17. The method of claim 12, wherein the initial evaluation is executed by a logic simulation EDA application or a deep bug hunting (DBH) EDA application.

18. The method of claim 12, wherein a given signal of the identified subset of signals for the counter-example trace corresponds to one of:
a finite state machine in the given circuit design;
an input in the given circuit design;
a counter in the given circuit design;
an array in the given circuit design; and
each uninitialized flop in the given circuit design.

19. A system comprising:
a non-transitory memory to store machine readable instructions; and
a processor to access the memory and execute the machine readable instructions, the machine readable instructions comprising:
a formal verification electronic design automation (EDA) application, the formal verification EDA application being configured to:
receive an initial formal verification of a given circuit design of an integrated circuit (IC) chip, the given circuit design comprising a list of properties for the IC chip, wherein the list of properties includes a list of assertions for the IC chip, wherein the initial formal verification includes a counter-example trace that characterizes a set of signals of the given circuit design of the IC chip over a respective plurality of cycles that reach a state in which a given assertion of the list of assertions does not hold true;
identify a subset of signals in the counter-example that remain in a specific constant value over the plurality of cycles;
generate a set of over-constraints for an over-constrained formal verification of the given circuit design of the IC chip based on the identified subset of signals;
receive a modified circuit design based on the counter example trace, wherein the modified circuit corresponds to the given circuit design modified based on the counter-example from the initial evaluation; and
execute the over-constrained formal verification for the modified circuit design of the IC chip that applies each over-constraint of the set of over-constraints, wherein the over-constrained formal verification has a smaller state space than the initial formal verification.

20. The system of claim 19, wherein the state space of the over-constrained formal verification is less than one-half the size of the state space of the initial formal verification.

* * * * *